(12) United States Patent
Tanaka et al.

(10) Patent No.: US 11,954,633 B2
(45) Date of Patent: Apr. 9, 2024

(54) INFORMATION PROCESSING DEVICE, INFORMATION PROCESSING METHOD, AND UNMANNED VEHICLE

(71) Applicant: RAKUTEN GROUP, INC., Tokyo (JP)

(72) Inventors: Daiki Tanaka, Tokyo (JP); Toshiaki Tazume, Tokyo (JP); Takayoshi Inuma, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 165 days.

(21) Appl. No.: 17/430,444

(22) PCT Filed: Oct. 7, 2020

(86) PCT No.: PCT/JP2020/038011
§ 371 (c)(1),
(2) Date: Aug. 12, 2021

(87) PCT Pub. No.: WO2022/074761
PCT Pub. Date: Apr. 14, 2022

(65) Prior Publication Data
US 2022/0309451 A1   Sep. 29, 2022

(51) Int. Cl.
*G06Q 10/0832* (2023.01)
*B65G 61/00* (2006.01)
*G06Q 10/0833* (2023.01)

(52) U.S. Cl.
CPC ......... *G06Q 10/0832* (2013.01); *B65G 61/00* (2013.01); *G06Q 10/0833* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| 11,513,538 | B1* | 11/2022 | Kaneria ................. G05D 1/106 |
| 2017/0349282 | A1* | 12/2017 | Thompson .............. H04L 51/52 |
| 2019/0041852 | A1* | 2/2019 | Schubert ................ G06N 3/045 |
| 2022/0027845 | A1* | 1/2022 | Silverstein ......... G06Q 10/0832 |

FOREIGN PATENT DOCUMENTS

| JP | 2019-095918 A | 6/2019 |
| JP | 2019-125027 A | 7/2019 |
| JP | 2020-053047 A | 4/2020 |

OTHER PUBLICATIONS

Mukadam, Kausar, Aishwarya Sinh, and Ruhina Karani. "Detection of landing areas for unmanned aerial vehicles." 2016 International Conference on Computing Communication Control and automation (ICCUBEA). IEEE, 2016. (Year: 2016).*
International Search Report for PCT/JP2020/038011 dated Dec. 22, 2020 [PCT/ISA/210].

* cited by examiner

Primary Examiner — Emmett K. Walsh
(74) Attorney, Agent, or Firm — Sughrue Mion, PLLC

(57) ABSTRACT

The information processing device acquires load information of a load to be transported by UGV 1; acquires environmental information obtained by sensing an environment around the UGV by a sensor mounted on the UGV at a transport destination of the load; and determines a place where the load is placed by the UGV at the transport destination on the basis of the load information and the environmental information.

13 Claims, 12 Drawing Sheets

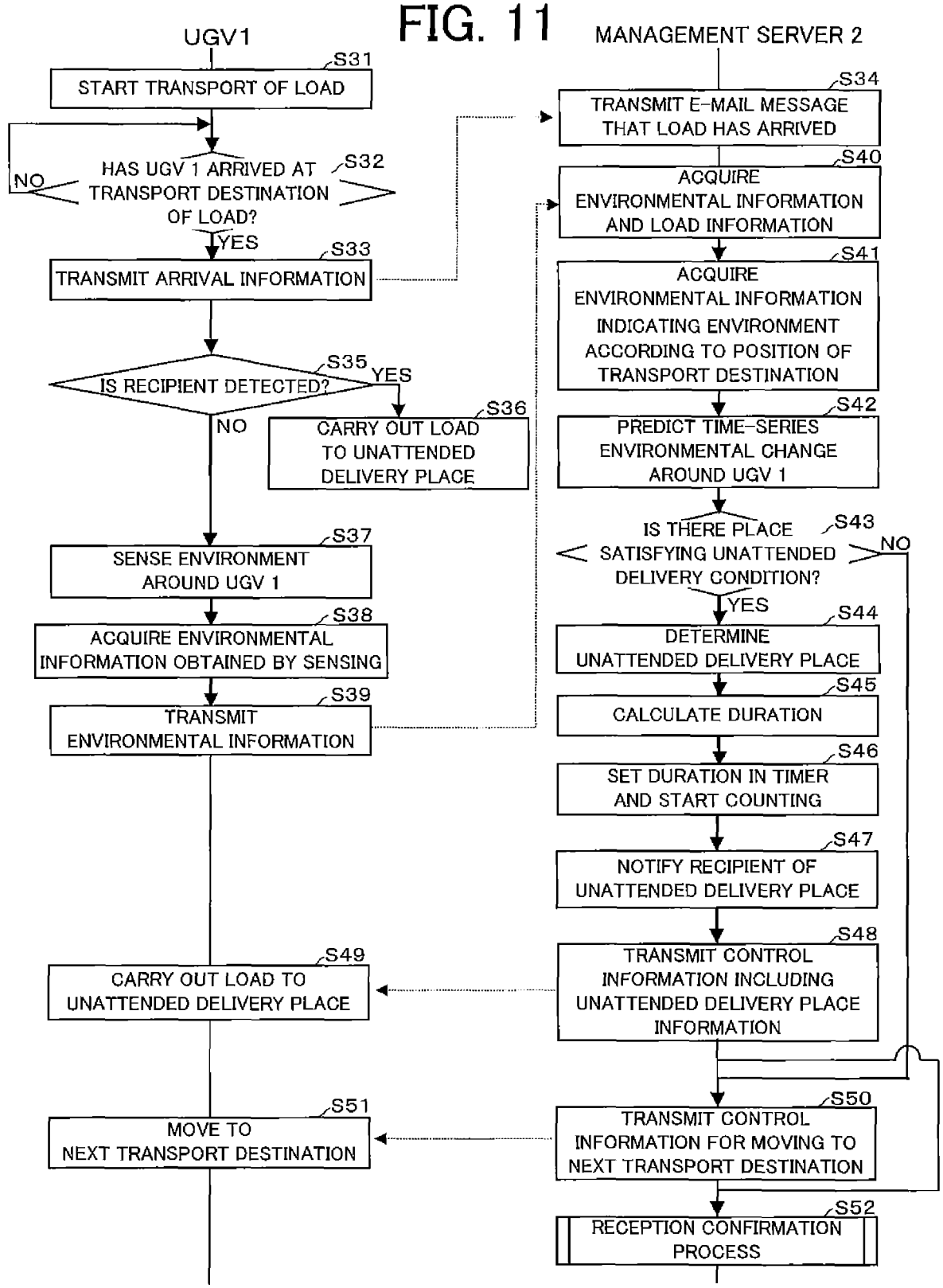

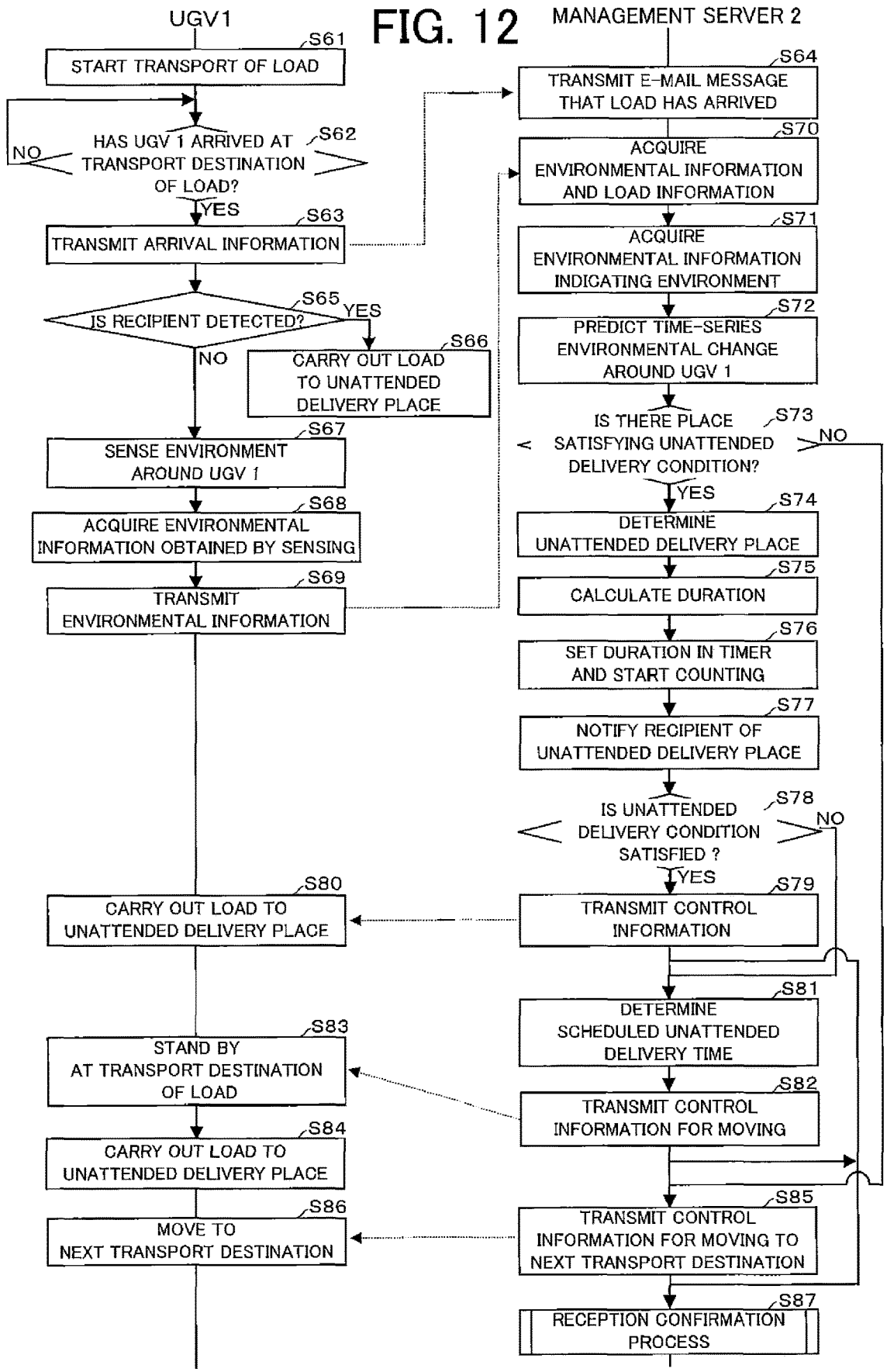

INFORMATION PROCESSING DEVICE, INFORMATION PROCESSING METHOD, AND UNMANNED VEHICLE

CROSS REFERENCE TO RELATED APPLICATIONS

This application is a National Stage of International Application No. PCT/W2020/038011 filed Oct. 7, 2020.

TECHNICAL FIELD

The present invention relates to a technical field such as a system for transporting a load to a transport destination by a mobile body.

BACKGROUND ART

Conventionally, for example, as a method for transporting a load such as a product purchased on an EC (Electronic Commerce) site, so-called "unattended delivery" of placing the load at an entrance, a storage, or the like of a transport destination is performed. According to the unattended delivery, since a recipient can receive a load in a non-face-to-face manner, the recipient does not need to be at home, and work cost associated with redelivery of the load can be reduced. Patent Literature 1 discloses a technique for appropriately unlocking an automatic lock and transporting a load when the load is placed and arranged in an apartment building having an automatic locking facility.

CITATION LIST

Patent Literature

Patent Literature 1: JP 2020-53047 A

SUMMARY OF INVENTION

Technical Problem

However, in a case where a load with limited freshness such as fresh food is left at an inappropriate place such as a high-temperature place due to the unattended delivery, there is a possibility that the load is damaged earlier than usual. Therefore, it is desirable that a load be placed in an appropriate place for each load in accordance with the environment of the transport destination.

Therefore, one or more embodiments of the present invention are directed to providing an information processing device, an information processing method, and an unmanned mobile body capable of placing a load in an appropriate place for each load in accordance with the environment of the transport destination.
Solution to In response to the above issue, the invention according to claim 1 is an information processing device including: a load information acquisition unit configured to acquire load information of a load to be transported by an unmanned mobile body being movable unmanned; an environmental information acquisition unit configured to acquire environmental information obtained by sensing an environment around the unmanned mobile body by a sensor mounted on the unmanned mobile body at a transport destination of the load; and a place determining unit configured to determine a place where the load is placed by the unmanned mobile body at the transport destination on the basis of the load information and the environmental information. This makes it possible to determine an appropriate place as the place where the load is placed for each load according to the environment of the transport destination, and to place the load at the determined place.

The invention according to claim 2 is the information processing device according to claim 1, wherein the environmental information acquisition unit acquires environmental information indicating an environment according to position information of the transport destination of the load, in addition to the environmental information obtained by sensing the environment around the unmanned mobile body. This makes it possible to determine a more appropriate place as the place where the load is placed.

The invention according to claim 3 is the information processing device according to claim 1 or 2, wherein the environmental information acquisition unit acquires environmental information obtained by sensing environments of a plurality of regions around the unmanned mobile body by the sensor, and the place determining unit determines the place where the load is placed in any region of the plurality of regions. This makes it possible to determine the place where the load is placed from a more appropriate region among a plurality of regions around the unmanned mobile body.

The invention according to claim 4 is the information processing device according to any one of claims 1 to 3, wherein the place determining unit determines a shaded place at the transport destination as the place where the load is placed. This makes it possible to minimize deterioration of the contents of the load due to influence of the temperature, even when the temperature is not measured at the transport destination.

The invention according to claim 5 is the information processing device according to any one of claims 1 to 4, wherein the place determining unit determines the place where the load is placed further on the basis of a scheduled receiving time of the load. This makes it possible to take a flexible response according to a schedule of a recipient of the load.

The invention according to claim 6 is the information processing device according to any one of claims 1 to 5 further including a prediction unit configured to predict a time-series environmental change around the unmanned mobile body on the basis of the environmental information. The place determining unit determines the place where the load is placed on the basis of the load information and the time-series environmental change predicted by the prediction unit. This makes it possible to determine an appropriate place as the place where the load is placed for each load, and the load can be placed at the place, in consideration of future environment of the transport destination.

The invention according to claim 7 is the information processing device according to claim 6, wherein the prediction unit predicts a time-series change in a shaded region as the time-series environmental change. This makes it possible to reduce the influence of a temperature on the load, even when the temperature is not measured and predicted at the transport destination.

The invention according to claim 8 is the information processing device according to claim 6 or 7 further including a structure information acquisition unit configured to acquire structure information of a building at the transport destination, wherein the prediction unit predicts the time-series environmental change around the unmanned mobile body on the basis of the environmental information and the structure information. This makes it to predict the environmental change with high accuracy at the transport destination.

The invention according to claim 9 is the information processing device according to any one of claims 6 to 8 further including: a time determining unit configured to determine a scheduled time for placing the load at the place determined by the place determining unit on the basis of the time-series environmental change predicted by the prediction unit; and a control unit configured to cause the unmanned mobile body to carry out the load in a case where the scheduled time determined by the time determining unit arrives. This makes it to minimize the influence of the environment on the load.

The invention according to claim 10 is the information processing device according to claim 9 further including a determination unit configured to determine whether to permit carrying out of the load on the basis of the environmental information obtained by sensing the environment around the unmanned mobile body when the scheduled time determined by the time determining unit arrives, wherein the control unit causes the unmanned mobile body to carry out the load in a case where the determination unit determines to permit the carrying out of the load.

The invention according to claim 11 is the information processing device according to any one of claims 1 to 10 further including a notification unit configured to notify a recipient of the load of the place determined by the place determining unit. This makes it to quickly notify the recipient of the place where the load is placed.

The invention according to claim 12 is the transport system according to claim 11 further including the control unit configured to perform control for collecting the load in a case where it is failed to confirm receipt of the load even after the place is notified to the recipient by the notification unit. This makes it to reliably prevent the load from being left.

The invention according to claim 13 is the information processing device according to any one of claims 1 to 12, wherein in a case where it is determined that he recipient is not able to receive the load directly at the transport destination, the place determining unit determines the place where the load is placed.

The invention according to claim 14 is the transport system according to any one of claims 1 to 13, wherein the sensing is performed in a case where it is determined that the recipient is not able to receive the load directly at the transport destination.

The invention according to claim 15 is the information processing device according to any one of claims 1 to 14, wherein the place where the load is placed is outside a house.

The invention according to claim 16 is an information processing method executed by one or a plurality of computers. The method includes steps of: acquiring load information of a load transported by an unmanned mobile body being movable unmanned; acquiring environmental information obtained by sensing an environment around the unmanned mobile body by a sensor mounted on the unmanned mobile body at a transport destination of the load; and determining a place where the load is placed by the unmanned mobile body at the transport destination on the basis of the load information and the environmental information.

The invention according to claim 17 is an unmanned mobile body being movable unmanned and configured to transport a load to a transport destination. The unmanned mobile body includes: a sensor configured to sense an environment around the unmanned mobile body at the transport destination of the load; and a control unit configured to carry out the load to a place determined on the basis of load information of the load and environmental information obtained by the sensor.

Advantageous Effect of the Invention

According to one or more embodiments of the present invention,

BRIEF DESCRIPTION OF THE DRAWINGS

FIG. 11 is a sequence diagram illustrating an example of an operation when a load is transported to a transport destination by the UGV 1 in Example 2.

FIG. 12 is a sequence diagram illustrating an example of an operation when a load is transported to a transport destination by the UGV 1 in Example 3.

DESCRIPTION OF EMBODIMENTS

Hereinafter, an embodiment of the present invention will be described with reference to the drawings.

[1. Configuration and Operation Outline of Transport System S]

Figure 1:
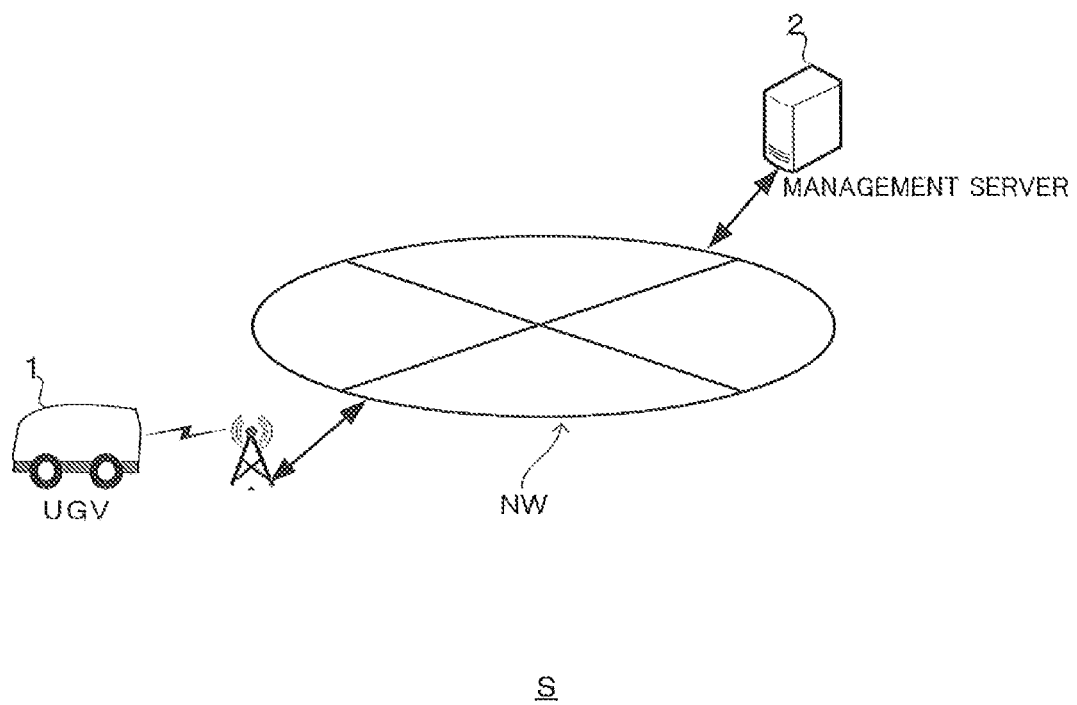
FIG. 1 is a diagram illustrating an outline configuration example of a transport system S according to an embodiment.

First, a configuration and an operation outline of a transport system S according to an embodiment of the present invention will be described with reference to FIG. 1. FIG. 1 is a diagram illustrating an outline configuration example of the transport system S according to the embodiment. As illustrated in FIG. 1, the transport system S includes an UGV (Unmanned Ground Vehicle) 1, a management server 2 (an example of an information processing device), and the like. The UGV 1 is an autonomous mobile body that is unmanned and autonomously movable. In the example of FIG. 1, one UGV 1 is illustrated, but in practice, there are a plurality of UGVs 1, and each UGV 1 is adapted to transport a load. The management server 2 is a server that manages information on a transported load. The UGV 1 and the management server 2 can be connected to a communication network NW and can communicate with each other via the communication network NW. The communication network NW includes, for example, the Internet, a mobile communication network, a radio base station thereof, and the like. Incidentally, although the UGV 1 illustrated in FIG. 1 shows an unmanned ground vehicle having a plurality of wheels for moving on the ground, the UGV 1 may be a mobile body such as a robot (for example, a biped walking robot) having no wheels.

In such a transport system S, the UGV 1 transports a carried load to a transport destination. Here, the load can also be referred to as an article or cargo. The load may be, for example, a product (ordered item) ordered on an EC site. The transport destination of the load is, for example, a delivery place where the load is delivered, such as a house where the recipient of the load lives or an office where the recipient works. In the present embodiment, in a case where it is difficult for the recipient of the load to directly receive the load from the UGV 1 due to absence at the transport destination or the like, it is assumed that the UGV 1 places the load at a specific place (outside the house) as the transport destination and leaves the place (that is, the unattended delivery). The place (hereinafter, referred to as "unattended delivery place") where the load is placed may be, for example, a ground (for example, concrete, soil, gravel, or turf ground) in front of a doorway (entrance) of a house or an office. Alternatively, in a case where the house is an apartment building (for example, a condominium or an apartment), the unattended delivery place may be near the common entrance of the apartment building.

[1-1. Configuration and Function of UGV 1]

Figure 2:
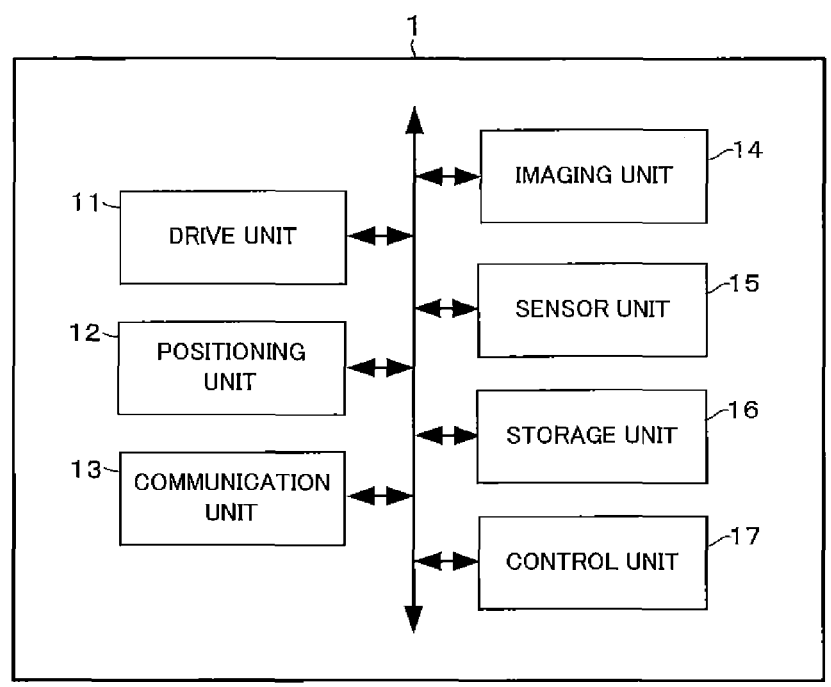
FIG. 2 is a diagram illustrating a schematic configuration example of an UGV 1.
Figure 3:
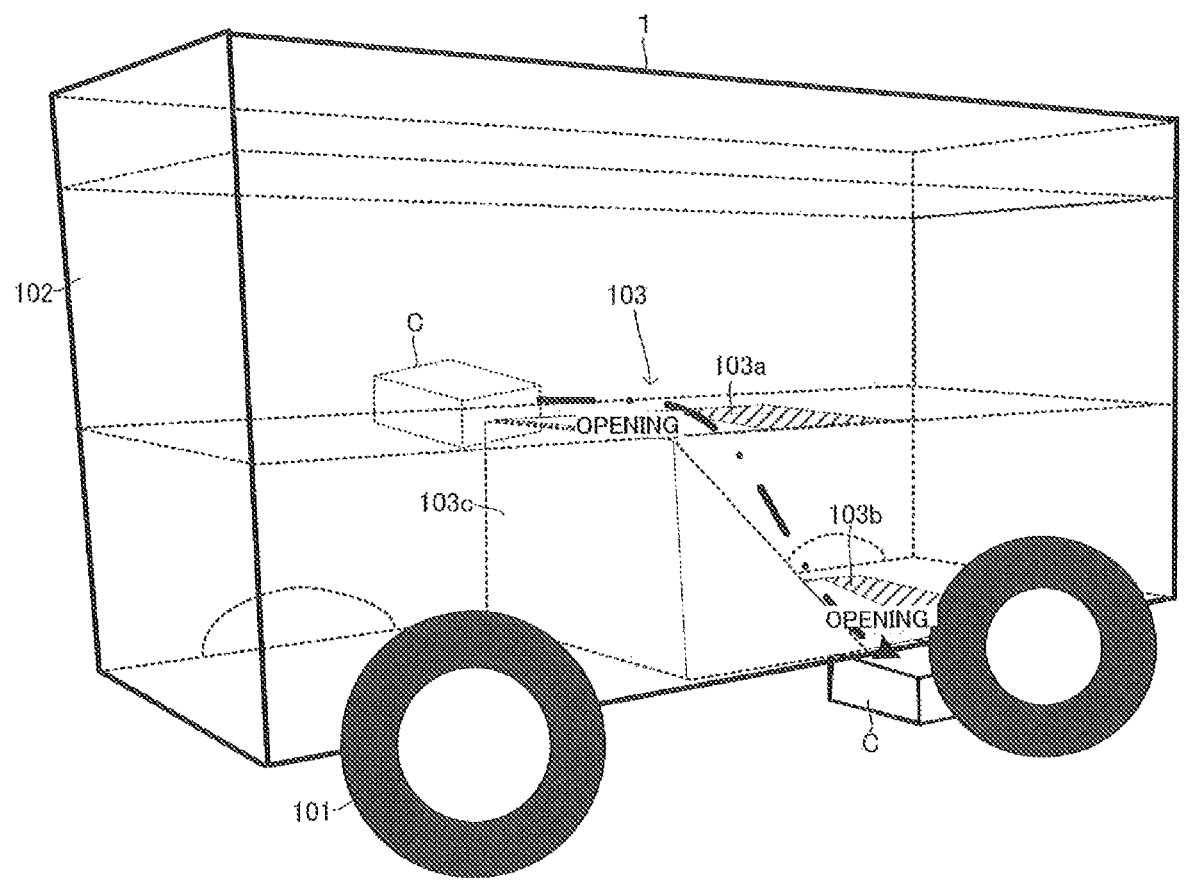
FIG. 3 is a diagram illustrating an outline structure example of appearance and inside of the UGV 1.
Figure 4:
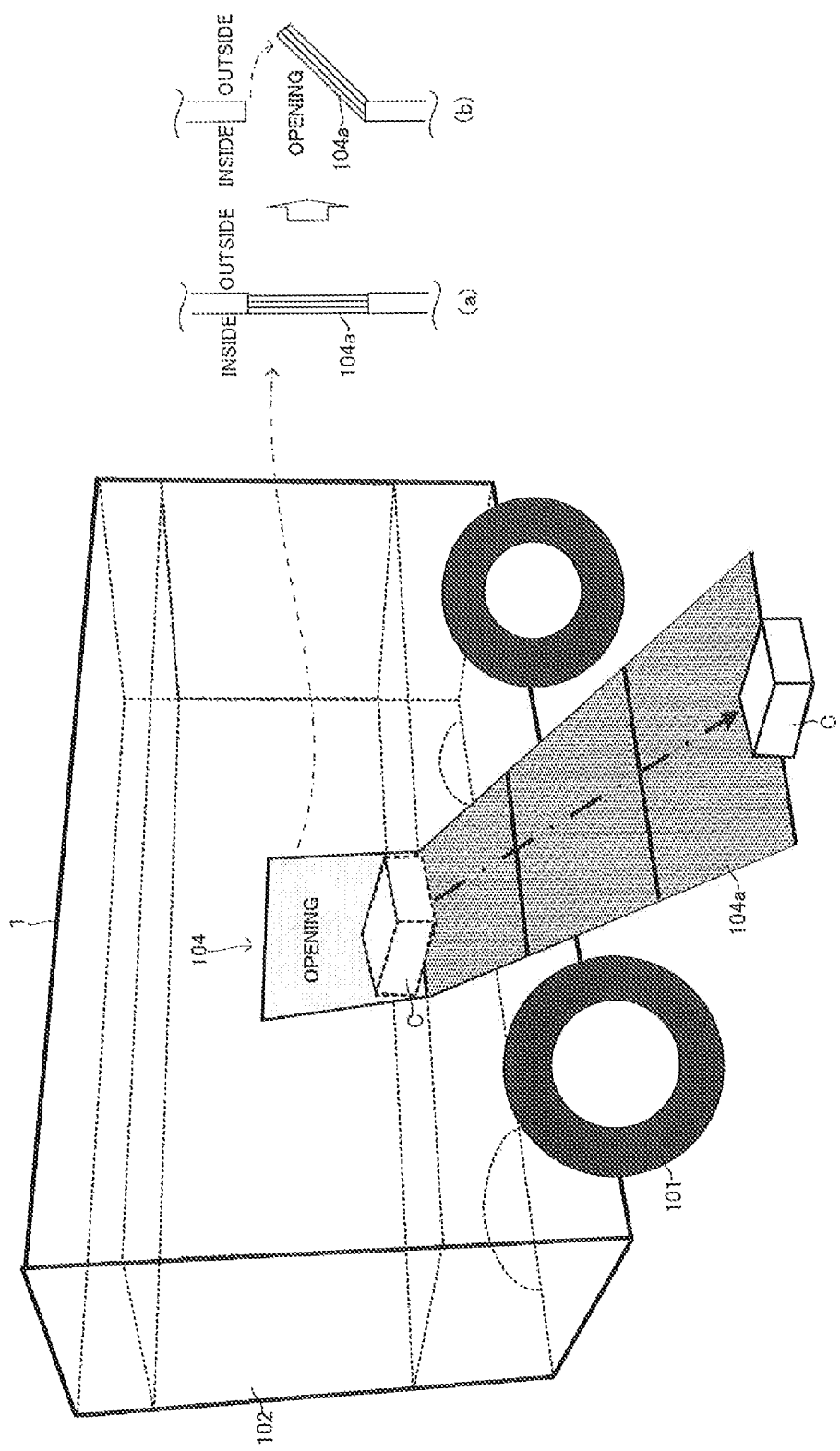
FIG. 4 is a diagram illustrating an outline structure example of appearance and inside of the UGV 1.

Next, a configuration and function of the UGV 1 will be described with reference to FIGS. 2 to 4. FIG. 2 is a diagram illustrating a schematic configuration example of the UGV 1. FIGS. 3 and 4 are diagrams illustrating an outline structure example of appearance and inside of the UGV 1. As illustrated in FIG. 2, the UGV 1 includes a drive unit 11, a positioning unit 12, a communication unit 13, an imaging unit 14, a sensor unit 15, a storage unit 16, a control unit 17, and the like. Incidentally, although not illustrated, the UGV 1 includes a battery that supplies power to each unit of the UGV 1. Moreover, as illustrated in FIGS. 3 and 4, the UGV 1 includes wheels 101, a load storage section 102, a load carry-in mechanism (not illustrated), a load carry-out mechanism 103 (or 104), and the like.

The drive unit 11 includes a motor, a rotation shaft, and the like. The drive unit 11 rotates a plurality of wheels 101 by a motor driven according to a control signal output from the control unit 17, a rotating shaft, and the like. The storage section 102 can store (carry) a plurality of loads and has a refrigerating function. Moreover, although not illustrated, the storage section 102 is provided with a moving mechanism that moves the stored load to a designated position in the storage section 102 according to a control signal from the control unit 17.

The carry-out mechanism 103 illustrated in FIG. 3 includes an actuator (not illustrated) including open/close doors 103a and 103b, a slider 103c, a motor, and the like. The open/close doors 103a and 103b are configured to slide, for example, by an actuator that converts a control signal output from the control unit 17 into a mechanical operation. In the example of FIG. 3, a load C stored in the storage section 102 is moved to an upper portion of the slider 103c by the moving mechanism in the storage section 102, and as indicated by an arrow in the figure, the load C passes through an opening of a portion where the open/close door 103a is located, slides on the slider 103c, then passes through an opening of a portion where the open/close door 103b is located, and is finally carried out to the unattended delivery place.

On the other hand, the carry-out mechanism 104 illustrated in FIG. 4 includes an open/close door 104a, and an actuator (not illustrated) including a motor and the like. The open/close door 104a is configured to be stretchable by overlapping a plurality of thin plates (see FIG. 4A), and falls to the outside of the UGV 1 by an actuator that converts a control signal output from the control unit 17 into a mechanical operation (see FIG. 4B), so that the thin plates of the open/close door 104a extends to form a slider. In the example of FIG. 4, the load C stored in the storage section 102 is moved to a portion where the open/close door 104a is located by the moving mechanism in the storage section 102, and as indicated by an arrow in the figure, the load C passes through an opening of the portion, slides on the slider formed by the open/close door 104a, and is carried out to the unattended delivery place. Incidentally, the carry-out mechanism 103 (or 104) illustrated in FIGS. 3 and 4 is an example, and other configurations may be adopted.

The positioning unit 12 includes a radio wave receiver and the like. For example, the positioning unit 12 receives a radio wave transmitted from satellites of a GNSS (Global Navigation Satellite System) by the radio waver receiver, and detects the current position (latitude and longitude) of the UGV 1 on the basis of the radio wave. Incidentally, the current position of the UGV 1 may be specified by a SLAM (Simultaneous Localization And Mapping) processing in addition to radio waves transmitted from a GNSS satellite. Moreover, the current position of the UGV 1 may be corrected based on the image captured by the imaging unit 14. Position information indicating the current position detected by the positioning unit 12 is output to the control unit 17. Moreover, the communication unit 13 controls communication performed via the communication network NW. The communication unit 13 preferably has a near field radio communication function such as Bluetooth (registered trademark). The imaging unit 14 includes, for example, a camera. The imaging unit 14 is used for movement control of the UGV 1. For example, the imaging unit 14 continuously images a real space within a range that falls within the angle of view of the camera. Image information captured by the imaging unit 14 is output to the control unit 17.

The sensor unit 15 includes a sensor that senses the environment around the UGV 1 at the transport destination. By mounting such a sensor on the UGV 1, it is possible to more efficiently sense the environment of the transport destination. Examples of such a sensor include an optical sensor, a temperature sensor, a humidity sensor, a weather sensor, and the like, and the sensor unit 15 preferably includes at least an optical sensor or a temperature sensor. The optical sensor is a sensor (for example, a camera) for optically sensing the environment around the UGV 1, and is mainly used for detecting shade at a transport destination. Incidentally, as the optical sensor, a camera provided in the imaging unit 14 may be used. Moreover, the weather sensor is a sensor for measuring weather such as wind around the UGV 1. Environmental information obtained by sensing the environment around the UGV 1 by the sensor unit 15 at the transport destination is output to the control unit 17. The environmental information includes, for example, at least one of a brightness distribution and a temperature distribution around the UGV 1. The environmental information may include at least one of a humidity distribution around the UGV 1 and a wind distribution (wind direction and wind speed). Incidentally, the environmental information may be obtained by sensing environments in a plurality of regions around the UGV 1 at the transport destination. In this case, the environmental information of each of the plurality of regions is output to the control unit 17.

The storage unit 16 includes a non-volatile memory or the like, and stores various programs and data. Moreover, the storage unit 16 stores a mobile body ID for identifying the UGV 1. The control unit 17 includes a CPU (Central Processing Unit), a ROM (Read Only Memory), a RAM (Random Access Memory), and the like, and executes various processes according to a program stored in the ROM (alternatively, a non-volatile memory may be used). For example, the control unit 17 performs movement control to move the UGV 1 to the transport destination of the load (for example, from a dispatch base to the transport destination of the load). In this movement control, the number of rotations of the wheel 101 and the position and the traveling direction of the UGV 1 are controlled using the position information acquired from the positioning unit 12, the image information acquired from the imaging unit 14, information on the transport destination of the load, and the like. As a result, the UGV 1 can autonomously move to the transport destination. Here, the information on the transport destination of the load may be set in the UGV 1 at, for example, a dispatch base of the load (in other words, a loading base of the load), or may be transmitted from the management server 2. The information on the transport destination of the load includes, for example, a load ID for identifying the load and location information of the transport destination of the load. The location information of the transport destination may be a transport destination address or position information (latitude and longitude) of the transport destination.

Moreover, when the UGV 1 arrives at the transport destination, the control unit 17 activates the sensor unit 15 and acquires environmental information obtained by sensing the environment around the UGV 1 (acquires as an environmental information acquisition unit). Then, the control unit 17 causes the communication unit 13 to transmit the mobile body ID of the UGV 1 together with the acquired environmental information to the management server 2. Thereafter, when the control unit 17 receives, for example, control information including unattended delivery information indicating the unattended delivery place determined by the management server 2 via the communication unit 13, the control unit performs carry-out control for carrying out the load at the unattended delivery place. For example, the control unit 17 adjusts the position of the UGV 1 on the basis of, for example, the image information acquired from the imaging unit 14, and then outputs a control signal to the moving mechanism in the storage section 102 and the carry-out mechanism 103 (or 104) to cause the carry-out mechanism 103 (or 104) to carry out the load to the unattended delivery place.

Incidentally, when the UGV 1 arrives at the transport destination, the control unit 17 may acquire structure information of a building (for example, a building where a load is placed) at the transport destination from image information captured by the imaging unit 14, for example. The structure information of the building is building information that may affect sunshine. For example, the structure information of the building includes height of the building. Moreover, the structure information of the building may include three-dimensional position information (for example, coordinates x, y, z in a three-dimensional real space) such as a wall, a floor, and a space under eaves near an entrance of the building. Moreover, the control unit 17 may cause the communication unit 13 to transmit the position information indicating the current position of the UGV 1 and carrying possibility information of the load to the management server 2 in time series. Here, the carrying possibility information of the load indicates whether or not the load can be carried at the present time. "Transmit in time series" means that it is continuously transmitted a plurality of times with the passage of time. A time interval at which the position information and the carrying possibility information are transmitted (that is, a transmitting interval) may be a regular interval or an irregular interval.

[1-2. Configuration and Function of Management Server 2]

Figure 5:
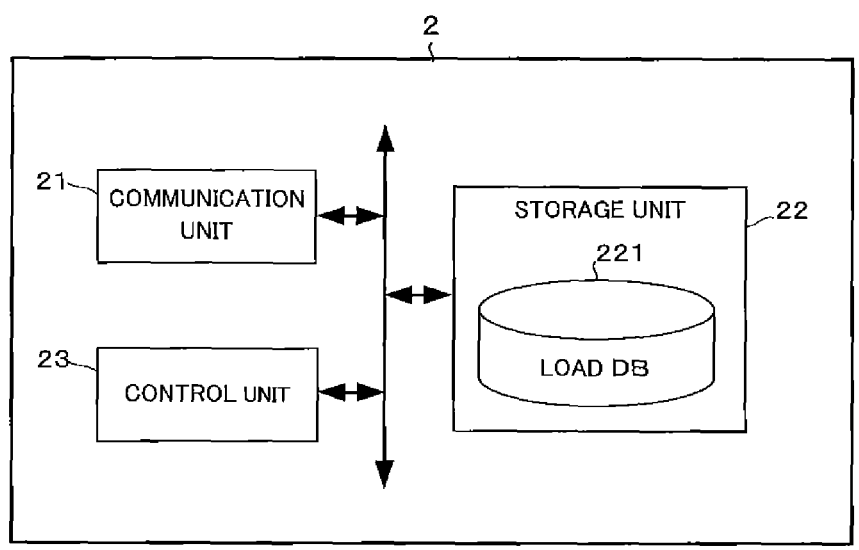
FIG. 5 is a diagram illustrating a schematic configuration example of a management server 2.

Next, a configuration and function of the management server 2 will be described with reference to FIG. 5 and the like. FIG. 5 is a diagram illustrating a schematic configuration example of the management server 2. As illustrated in FIG. 5, the management server 2 includes a communication unit 21, a storage unit 22, a control unit 23, and the like. The communication unit 21 controls communication performed via the communication network NW. The storage unit 22 includes, for example, a hard disk drive or the like, and stores various programs and data. For example, a load database (DB) 221 and the like are constructed in the storage unit 22. In the load database 221, a load ID of a load, load information of a load, transport destination information of a load, a mobile body ID of the UGV 1 that conveys a load, a delivery schedule (for example, scheduled delivery time) of a load, information on a recipient of a load (for example, the recipient's name and electronic mail address), and the like are stored in association with each load.

Here, the load information of the load includes a type of load. Examples of the type of load include food, beverages, clothing, medical articles, daily necessities, electrical appliances, and books. The food is preferably classified into food requiring freezing (frozen food) and food not requiring freezing. Moreover, the food is preferably classified into food requiring refrigeration (for example, fresh food such as vegetables, fruits, fresh fish, and fresh meat) and food not requiring refrigeration (for example, processed food or the like). Moreover, electrical appliances are preferably classified into a product including a precision component such as an electronic component and a product not including a precision component.

Then, each type thereof is preferably associated with information indicating whether or not to be arrangeable in the sun. Alternatively, each type thereof may be associated with at least one of information indicating whether or not to be affected by temperature (for example, whether or not there is a possibility of deterioration at a temperature of X° C. or higher), information indicating whether or not to be affected by humidity (for example, whether or not there is a possibility of deterioration at a humidity of Y % or higher), and information indicating whether or not to be affected by wind (for example, whether or not there is a possibility of being blown off at a wind speed of Z m/s). Here, the information indicating whether or not to be affected may be information indicating an unaffected range. For example, examples of an unaffected temperature range include lower than 17° C., lower than 25° C., or lower than 30° C., and the like.

Moreover, the load database 221 may store position information indicating the current position of the UGV 1, carrying possibility information of the load, address information for accessing the UGV 1 by wireless communication, and the like in association with the mobile body ID of the UGV 1 that transports the load. Here, the position information and the carrying possibility information of the load are updated each time the communication unit 21 receives the information from the UGV 1.

Moreover, the load database 221 may store a scheduled receiving time of the load by the recipient in association with the load ID. For example, in a case where the load is a product ordered on an EC site, a scheduled receiving time of the product is stored in the load database 221 by an orderer designating the scheduled receiving time as well as availability of the unattended delivery on a product order screen displayed on a terminal of the orderer (for example, the recipient himself/herself) from the EC site. Incidentally, the storage unit 22 may store a three-dimensional map of a specific region including the transport destination. The three-dimensional map is, for example, data indicating the position and height of a building or the like existing in the specific region.

Figure 6:
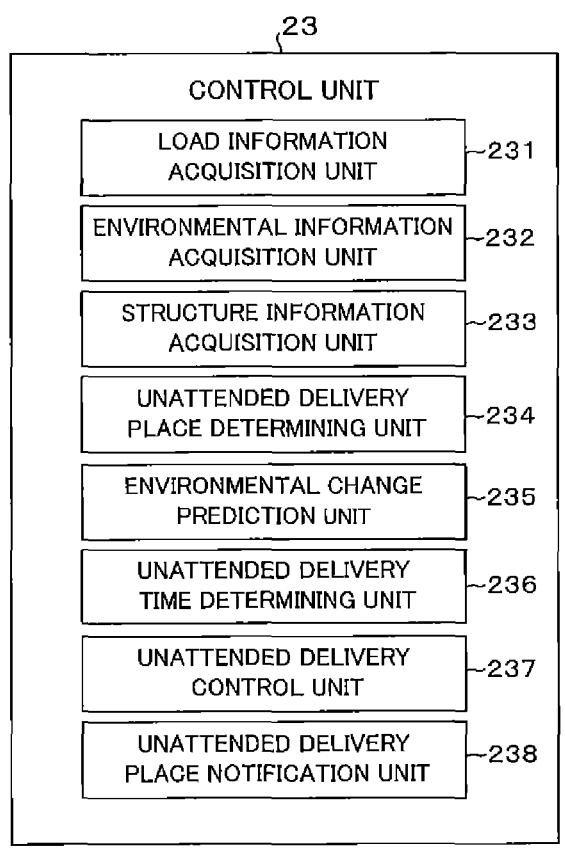
FIG. 6 is a diagram illustrating an example of functional blocks in a control unit 23.

The control unit 23 includes a CPU, a ROM, a RAM, and the like, and executes various processes according to a program stored in a ROM (alternatively, a non-volatile memory may be used). FIG. 6 is a diagram illustrating an example of functional blocks in the control unit 23. By executing the program, as illustrated in FIG. 6, the control unit 23 functions as a load information acquisition unit 231, an environmental information acquisition unit 232, a structure information acquisition unit 233, a unattended delivery place determining unit 234 (an example of a place determining unit), an environmental change prediction unit 235 (an example of a prediction unit), a unattended delivery time determining unit 236 (an example of a time determining unit), a unattended delivery control unit (an example of a determination unit and a control unit) 237, a unattended delivery place notification unit 238 (an example of a notification unit), and the like. Incidentally, the environmental change prediction unit 235 is preferably operated as a function of the unattended delivery place determining unit 234. The function of the environmental change prediction unit 235 can be set to ON/OFF.

The load information acquisition unit 231 acquires the load information of the load transported by the UGV 1 from, for example, the load database 221. The environmental information acquisition unit 232 acquires, from the UGV 1 via the communication unit 21, environmental information obtained by sensing the environment around the UGV 1 at the transport destination of the load transported by the UGV 1. Here, the environmental information acquisition unit 232 may acquire environmental information obtained by sensing environments in a plurality of regions around the UGV 1.

Moreover, in addition to the environmental information obtained by sensing the environment around the UGV 1 at the transport destination of the load, the environmental information acquisition unit 232 may acquire environmental information indicating an environment according to the position information (for example, latitude and longitude) of the transport destination from, for example, a weather prediction server via the communication unit 21. Such environmental information includes, for example, the weather (forecast), air temperature (forecast), humidity (forecast), wind speed (forecast), wind direction (forecast), sun altitude, sun azimuth, and the like of the day (for example, from the current time to sunset) at the transport destination. Incidentally, the environmental information may include sunshine hours of the day at the transport destination. The structure information acquisition unit 233 acquires the structure information of the building at the transport destination of the load from the UGV 1 via the communication unit 21. Moreover, the structure information acquisition unit 233 may acquire the structure information of the building (for example, the height of the building) at the transport destination of the load from the three-dimensional map stored in the storage unit 22.

The unattended delivery place determining unit 234 determines the unattended delivery place of the load at the transport destination of the load on the basis of the load information acquired by the load information acquisition unit 231 and the environmental information acquired by the environmental information acquisition unit 232. As a result, an appropriate place for each load can be determined as the unattended delivery place in accordance with the environment of the transport destination. Here, it is desirable that the unattended delivery place be a planar region that requires at least a certain area (that is, an area equal to or larger than the plane size of the load) where the load can be placed, and has an inclination equal to or less than a threshold value.

Figure 7:
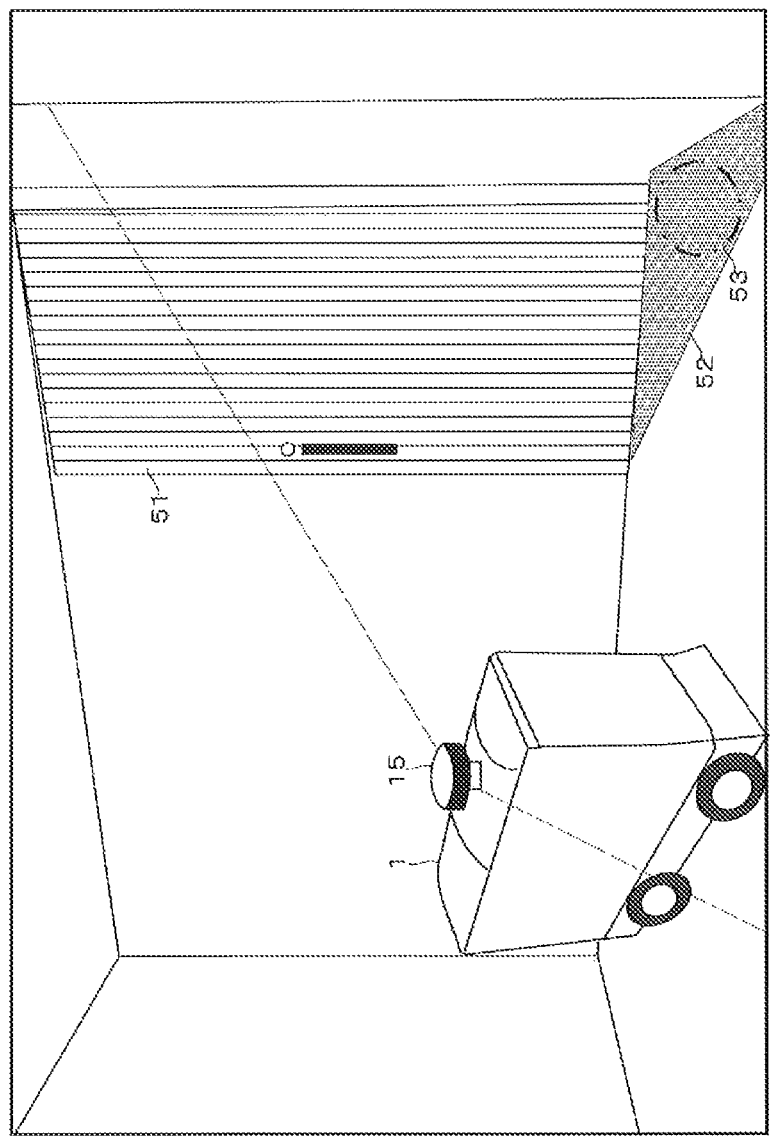
FIG. 7 is a diagram illustrating an example of a unattended delivery place determined at a transport destination of a load.

In a case where information indicating "not arrangeable in the sun" is associated with the type included in the load information acquired by the load information acquisition unit 231, the unattended delivery place determining unit 234 determines a place (for example, a shaded place) satisfying the unattended delivery condition as the unattended delivery place on the basis of the brightness distribution around the UGV 1 at the transport destination of the load. For example, a region (shaded region) having brightness equal to or less than a first threshold value is the place satisfying the unattended delivery condition. FIG. 7 is a diagram illustrating an example of the unattended delivery place determined at the transport destination of the load. In the example of FIG. 7, the unattended delivery place 53 is determined in a shaded region 52 in front of a door 51 of the doorway of the house. As a result, even when the temperature is not measured at the transport destination, it is possible to minimize the deterioration of the contents of the load due to the influence of the temperature.

Moreover, in a case where information indicating that "not arrangeable in the sun" and "being affected by temperature" is associated with the type included in the load information, the unattended delivery place determining unit 234 determines, as the unattended delivery place, a region (that is, a place satisfying the unattended delivery condition) where the brightness is equal to or less than the first threshold value and the temperature is equal to or less than a second threshold value on the basis of the brightness distribution and the temperature distribution around the UGV 1 at the transport destination of the load.

Moreover, in a case where information indicating that "not arrangeable in the sun" and "being affected by humidity" is associated with the type included in the load information, the unattended delivery place determining unit 234 determines, as the unattended delivery place, a region (that is, a place satisfying the unattended delivery condition) where the brightness is equal to or less than the first threshold value and the humidity is equal to or less than a third threshold value on the basis of the brightness distribution and the humidity distribution around the UGV 1 at the transport destination of the load.

Moreover, in a case where information indicating that "not arrangeable in the sun" and "being affected by wind" is associated with the type included in the load information, the unattended delivery place determining unit 234 determines, as the unattended delivery place, a region (that is, a place satisfying the unattended delivery condition) where the brightness is equal to or less than the first threshold value and the wind speed is equal to or less than a fourth threshold value on the basis of the brightness distribution and the wind distribution around the UGV 1 at the transport destination of the load.

Incidentally, in a case where one information piece indicating "being affected by temperature" is associated with the type included in the load information, the unattended delivery place determining unit 234 determines a region (that is, a place satisfying the unattended delivery condition) where the temperature is equal to or less than the second threshold value as the unattended delivery place on the basis of the temperature distribution around the UGV 1 at the transport destination of the load. Alternatively, when information indicating an "unaffected temperature range" is associated with the type included in the load information, the unattended delivery place determining unit 234 determines a region within the temperature range (that is, a place satisfying the unattended delivery condition) as the unattended delivery place on the basis of the temperature distribution around the UGV 1 at the transport destination of the load.

Moreover, in a case where one information piece indicating "being affected by humidity" is associated with the type included in the load information, the unattended delivery place determining unit 234 determines a region (that is, a place satisfying the unattended delivery condition) where the humidity is equal to or less than the third threshold value as the unattended delivery place on the basis of the humidity distribution around the UGV 1 at the transport destination of the load. Alternatively, when information indicating an "unaffected humidity range" is associated with the type included in the load information, the unattended delivery place determining unit 234 determines a region within the humidity range (that is, a place satisfying the unattended delivery condition) as the unattended delivery place on the basis of the humidity distribution around the UGV 1 at the transport destination of the load.

Moreover, in a case where one information piece indicating "being affected by wind" is associated with the type included in the load information, the unattended delivery place determining unit 234 determines a region (that is, a place satisfying the unattended delivery condition) where the wind speed is equal to or less than the fourth threshold value as the unattended delivery place on the basis of the wind distribution around the UGV 1 at the transport destination of the load. Alternatively, when information indicating an "unaffected wind speed range" is associated with the type included in the load information, the unattended delivery place determining unit 234 determines a region within the wind speed range (that is, a place satisfying the unattended delivery condition) as the unattended delivery place on the basis of the wind distribution around the UGV 1 at the transport destination of the load.

Incidentally, the unattended delivery place may be determined based on a combination of at least any two of temperature, humidity, and wind speed. For example, in a case where information indicating "being affected by temperature and humidity" is associated with the type included in the load information, the unattended delivery place determining unit 234 may determine a region (that is, a place satisfying the unattended delivery condition) where the temperature is equal to or less than the second threshold value and the humidity is equal to or less than the third threshold value as the unattended delivery place on the basis of the temperature distribution and the humidity distribution around the UGV 1 at the transport destination of the load. Moreover, in a case where information indicating "being affected by temperature and wind" is associated with the type included in the load information, the unattended delivery place determining unit 234 may determine a region (that is, a place satisfying the unattended delivery condition) where the temperature is equal to or less than the second threshold value and the wind speed is equal to or less than the fourth threshold value as the unattended delivery place on the basis of the temperature distribution and the wind distribution around the UGV 1 at the transport destination of the load.

Moreover, in a case where information indicating "being affected by humidity and wind" is associated with the type included in the load information, the unattended delivery place determining unit 234 may determine a region (that is, a place satisfying the unattended delivery condition) where the humidity is equal to or less than the third threshold value and the wind speed is equal to or less than the fourth threshold value as the unattended delivery place on the basis of the humidity distribution and the wind distribution around the UGV 1 at the transport destination of the load. Moreover, in a case where information indicating "being affected by temperature, humidity, and wind" is associated with the type included in the load information, the unattended delivery place determining unit 234 may determine a region (that is, a place satisfying the unattended delivery condition) where the temperature is equal to or less than the second threshold value, the humidity is equal to or less than the third threshold value, and the wind speed is equal to or less than the fourth threshold value as the unattended delivery place on the basis of the temperature distribution, the humidity distribution, and the wind distribution around the UGV 1 at the transport destination of the load.

Incidentally, in the example described above, the unattended delivery place of the load is determined based on the environmental information obtained by sensing the environment at the transport destination of the load. However, in addition to the environmental information, a place satisfying the unattended delivery condition may be determined as the unattended delivery place of the load based on the environmental information indicating the environment according to the position information of the transport destination of the load. As a result, a more appropriate place can be determined as the unattended delivery place. That is, for example, since the environment at the transport destination may change from moment to moment, the unattended delivery place of the load may be determined based on not only the environmental information at the time of sensing at the transport destination but also the future environmental information (predicted environmental information) from the time of sensing. In this case, the environmental change prediction unit 235 is set to ON.

The environmental change prediction unit 235 predicts a time-series environmental change around the UGV 1 on the basis of the environmental information indicating the environment according to the position information of the transport destination of the load in addition to the load information acquired by the load information acquisition unit 231 and the environmental information obtained by sensing the environment at the transport destination of the load. That is, the environmental change prediction unit 235 predicts subsequent environmental changes on the basis of the environment actually sensed at the transport destination of the load by analyzing the environment (forecast) according to the position information of the transport destination by reference. Then, the unattended delivery place determining unit 234 determines a place satisfying the unattended delivery condition as the unattended delivery place of the load on the basis of the time-series environmental change predicted by the environmental change prediction unit 235. As a result, in consideration of the future environment (that is, the environment that can be changed from the time of sensing) of the transport destination, it is possible to determine an appropriate place as the unattended delivery place for each load.

For example, in the case where the information indicating that "not arrangeable in the sun" is associated with the type included in the load information, the environmental change prediction unit 235 predicts a time-series change in the shaded region (for example, the region having brightness equal to or less than the first threshold value) by predicting a time-series brightness change (that is, a change from the present time) around the UGV 1 on the basis of the brightness distribution around the UGV 1 at the transport destination of the load and the weather (or sunshine hours) of the day. As a result, even when the temperature is not measured and predicted at the transport destination, it is possible to reduce the influence of the temperature on the load. Alternatively, the environmental change prediction unit 235 may predict the time-series change in the shaded region by predicting the time-series brightness change around the UGV 1 on the basis of the brightness distribution around the UGV 1 at the transport destination of the load, and the sun altitude and sun azimuth of the day.

Here, the environmental change prediction unit 235 may predict the time-series brightness change around the UGV 1 on the basis of the brightness distribution around the UGV 1 at the transport destination of the load, the sun altitude and sun azimuth of the day, and the structure information of the building at the transport destination. This makes it possible to predict the time-series change in the shaded region with high accuracy. The structure information used here may be a height of a building, or may be three-dimensional position information such as a wall, a floor, and a space under eaves near an entrance of a building instead of (or in addition to) the height of the building.

Then, on the basis of the time-series change in the shaded region predicted by the environmental change prediction unit 235, the unattended delivery place determining unit 234 determines the shaded region continuing for a predetermined time T or longer as the unattended delivery place. That is, in this case, the region where a shade duration is equal to or longer than the predetermined time T is the place satisfying the unattended delivery condition. Here, a start point of the predetermined time T may be the present time (in other words, the time of sensing) or may be a time when a minutes (for example, 5 minutes) have elapsed from the present time. Incidentally, the concept of the predetermined time T is the same as that when the unattended delivery place is determined based on the following temperature change, humidity change, or wind speed change.

Moreover, in the case where the information indicating that "not arrangeable in the sun" and "being affected by temperature" is associated with the type included in the load information, the environmental change prediction unit 235 predicts the time-series brightness change and temperature change around the UGV 1 on the basis of the time-series brightness distribution and temperature distribution around the UGV 1 at the transport destination of the load and the weather (or sunshine hours) and air temperature (forecast) of the day. Alternatively, the environmental change prediction unit 235 may predict the time-series brightness change and temperature change around the UGV 1 on the basis of the time-series brightness distribution and temperature distribution around the UGV 1 at the transport destination of the load, and the sun altitude, sun azimuth, and air temperature (forecast) of the day. Also in this case, the environmental change prediction unit 235 may predict the time-series brightness change around the UGV 1 further on the basis of the structure information of the building. Then, on the basis of the time-series brightness change and temperature change predicted by the environmental change prediction unit 235, the unattended delivery place determining unit 234 determines, as the unattended delivery place, a region (that is, a place satisfying the unattended delivery condition) where the brightness is continuously equal to or less than the first threshold value for the predetermined time T or longer and the temperature is continuously equal to or less than the second threshold value for the predetermined time T or longer.

Moreover, in the case where the information indicating that "not arrangeable in the sun" and "being affected by humidity" is associated with the type included in the load information, the environmental change prediction unit 235 predicts the time-series brightness change and humidity change around the UGV 1 on the basis of the time-series brightness distribution and humidity distribution around the UGV 1 at the transport destination of the load and the weather (or sunshine hours) and humidity (forecast) of the day. Alternatively, the environmental change prediction unit 235 may predict the time-series brightness change and humidity change around the UGV 1 on the basis of the time-series brightness distribution and humidity distribution around the UGV 1 at the transport destination of the load, and the sun altitude, sun azimuth, and humidity (forecast) of the day. Also in this case, the environmental change prediction unit 235 may predict the time-series brightness change around the UGV 1 further on the basis of the structure information of the building. Then, on the basis of the time-series brightness change and humidity change predicted by the environmental change prediction unit 235, the unattended delivery place determining unit 234 determines, as the unattended delivery place, a region (that is, a place satisfying the unattended delivery condition) where the brightness is continuously equal to or less than the first threshold value for the predetermined time T or longer and the humidity is continuously equal to or less than the third threshold value for the predetermined time T or longer.

Moreover, in the case where the information indicating that "not arrangeable in the sun" and "being affected by wind" is associated with the type included in the load information, the environmental change prediction unit 235 predicts the time-series brightness change and wind speed change around the UGV 1 on the basis of the time-series brightness distribution and wind distribution around the UGV 1 at the transport destination of the load and the weather (or sunshine hours) and wind speed (forecast) of the day. Alternatively, the environmental change prediction unit 235 may predict the time-series brightness change and wind speed change around the UGV 1 on the basis of the time-series brightness distribution and wind distribution around the UGV 1 at the transport destination of the load, and the sun altitude, sun azimuth, and wind speed (forecast) of the day. Also in this case, the environmental change prediction unit 235 may predict the time-series brightness change around the UGV 1 further on the basis of the structure information of the building. Then, on the basis of the time-series brightness change and wind speed change predicted by the environmental change prediction unit 235, the unattended delivery place determining unit 234 determines, as the unattended delivery place, a region (that is, a place satisfying the unattended delivery condition) where the brightness is continuously equal to or less than the first threshold value for the predetermined time T or longer and the wind speed is continuously equal to or less than the fourth threshold value for the predetermined time T or longer.

Incidentally, in the case where one information indicating piece "being affected by temperature" is associated with the type included in the load information, the environmental change prediction unit 235 predicts the time-series temperature change around the UGV 1 on the basis of the time-series temperature distribution around the UGV 1 at the transport destination of the load and the air temperature (forecast) of the day. Then, on the basis of the time-series temperature change predicted by the environmental change prediction unit 235, the unattended delivery place determining unit 234 determines, as the unattended delivery place, a region (that is, a place satisfying the unattended delivery condition) where the temperature is continuously equal to or less than the second threshold value for the predetermined time T or longer.

Moreover, in the case where one information piece indicating "being affected by humidity" is associated with the type included in the load information, the environmental change prediction unit 235 predicts the time-series humidity change around the UGV 1 on the basis of the time-series humidity distribution around the UGV 1 at the transport destination of the load and the humidity (forecast) of the day. Then, on the basis of the time-series humidity change predicted by the environmental change prediction unit 235, the unattended delivery place determining unit 234 determines, as the unattended delivery place, a region (that is, a place satisfying the unattended delivery condition) where the humidity is continuously equal to or less than the third threshold value for the predetermined time T or longer.

Moreover, in the case where one information piece indicating "being affected by wind" is associated with the type included in the load information, the environmental change prediction unit 235 predicts the time-series wind speed change around the UGV 1 on the basis of the time-series wind distribution around the UGV 1 at the transport destination of the load and the wind speed (forecast) of the day. Then, on the basis of the time-series wind speed change predicted by the environmental change prediction unit 235, the unattended delivery place determining unit 234 determines, as the unattended delivery place, a region (that is, a place satisfying the unattended delivery condition) where the wind speed is continuously equal to or less than the fourth threshold value for the predetermined time T or longer.

Incidentally, the time-series environmental change may be predicted on the basis of a combination of at least any two of temperature, humidity, and wind speed. For example, in the case where the information indicating "being affected by temperature and humidity" is associated with the type included in the load information, the environmental change prediction unit 235 predicts the time-series temperature change and humidity change around the UGV 1 on the basis of the time-series temperature distribution and humidity distribution around the UGV 1 at the transport destination of the load and the air temperature (forecast) and humidity (forecast) of the day. Then, on the basis of the time-series temperature change and humidity change predicted by the environmental change prediction unit 235, the unattended delivery place determining unit 234 determines, as the unattended delivery place, a region (that is, a place satisfying the unattended delivery condition) where the temperature is continuously equal to or less than the second threshold value for the predetermined time T or longer and the humidity is continuously equal to or less than the third threshold value for the predetermined time T or longer.

Moreover, in the case where the information indicating "being affected by temperature and wind" is associated with the type included in the load information, the environmental change prediction unit 235 predicts the time-series temperature change and wind speed change around the UGV 1 on the basis of the time-series temperature distribution and wind distribution around the UGV 1 at the transport destination of the load and the air temperature (forecast) and wind speed (forecast) of the day. Then, on the basis of the time-series temperature change and wind speed change predicted by the environmental change prediction unit 235, the unattended delivery place determining unit 234 determines, as the unattended delivery place, a region (that is, a place satisfying the unattended delivery condition) where the temperature is continuously equal to or less than the second threshold value for the predetermined time T or longer and the wind speed is continuously equal to or less than the fourth threshold value for the predetermined time T or longer.

Moreover, in the case where the information indicating "being affected by humidity and wind" is associated with the type included in the load information, the environmental change prediction unit 235 predicts the time-series humidity change and wind speed change around the UGV 1 on the basis of the time-series humidity distribution and wind distribution around the UGV 1 at the transport destination of the load and the humidity (forecast) and wind speed (forecast) of the day. Then, on the basis of the time-series humidity change and wind speed change predicted by the environmental change prediction unit 235, the unattended delivery place determining unit 234 determines, as the unattended delivery place, a region (that is, a place satisfying the unattended delivery condition) where the humidity is continuously equal to or less than the third threshold value for the predetermined time T or longer and the wind speed is continuously equal to or less than the fourth threshold value for the predetermined time T or longer.

Moreover, in the case where the information indicating "being affected by temperature, humidity, and wind" is associated with the type included in the load information, the environmental change prediction unit 235 predicts the time-series temperature change, humidity change, and wind speed change around the UGV 1 on the basis of the time-series temperature distribution, humidity distribution, and wind distribution around the UGV 1 at the transport destination of the load and the air temperature (forecast), humidity (forecast), and wind speed (forecast) of the day. Then, on the basis of the time-series temperature change, humidity change, and wind speed change predicted by the environmental change prediction unit 235, the unattended delivery place determining unit 234 determines, as the unattended delivery place, a region (that is, a place satisfying the unattended delivery condition) where the temperature is continuously the second threshold value for the predetermined time T or longer, the humidity is continuously equal to or less than the third threshold value for the predetermined time T or longer, and the wind speed is continuously equal to or less than the fourth threshold value for the predetermined time T or longer.

The unattended delivery time determining unit 236 determines a scheduled unattended delivery time for placing the load at the unattended delivery place determined by the unattended delivery place determining unit 234 on the basis of the time-series environmental change predicted by the environmental change prediction unit 235. Here, the scheduled unattended delivery time is, in other words, a standby time during which the UGV 1 stands by at the transport destination to place the load. The scheduled unattended delivery time may be set on the basis of the delivery schedule of the load. That is, the time for standing by at the transport destination may be set to a time at which there is no problem in delivering another load to the next delivery destination. As a result, it is possible to minimize the influence of the environment on the load. Incidentally, the scheduled unattended delivery time may be determined, for example, in a case where there is a margin in the delivery schedule and the start point of the predetermined time T described above is the time when a minutes have elapsed from the present time (in this case, it is expected that there is no place satisfying the unattended delivery condition until α minutes elapse).

Figure 8:
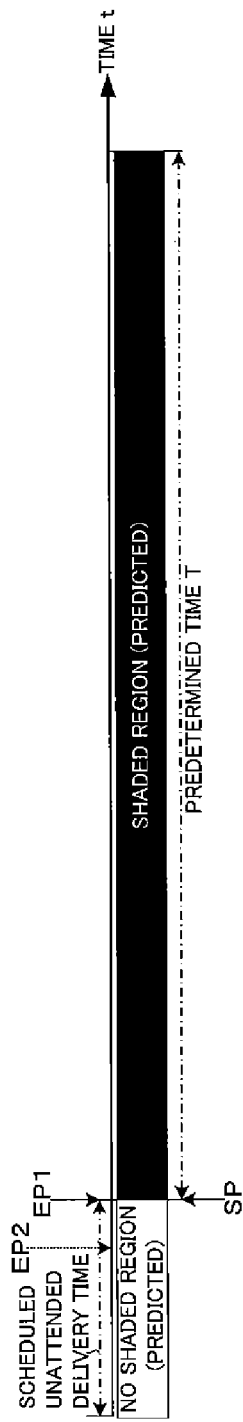
FIG. 8 is a diagram illustrating a relationship between a start point of a predetermined time T and a scheduled unattended delivery time.

FIG. 8 is a diagram illustrating a relationship between the start point of the predetermined time T and the scheduled unattended delivery time. The example of FIG. 8 is an example of a case where a shaded region continuing for the predetermined time T or longer at the transport destination is determined as the unattended delivery place. As illustrated in FIG. 8, it is desirable that a start point SP of the predetermined time T (for example, 90 minutes) and an end point EP1 of the scheduled unattended delivery time coincide with each other. However, in consideration of the delivery schedule of the load, as illustrated in FIG. 8, an end point EP2 of the scheduled unattended delivery time may be set before the start point SP of the predetermined time T (that is, before the unattended delivery place becomes the shaded region). Incidentally, the scheduled unattended delivery time may be represented by a duration from the present time or may be represented by a time (for example, y (hours): z (minutes)).

The unattended delivery control unit 237 causes the communication unit 21 to transmit control information including unattended delivery place information indicating the unattended delivery place determined by the unattended delivery place determining unit 234 to the UGV 1. With the control information including the unattended delivery place information, the unattended delivery control unit 237 causes the UGV 1 to carry out the load to the unattended delivery place. Here, the unattended delivery place information is represented by, for example, the latitude and longitude of the center of the determined unattended delivery place. Moreover, when the scheduled unattended delivery time is determined by the unattended delivery time determining unit 236, the unattended delivery control unit 237 causes the communication unit 21 to transmit control information including the unattended delivery place information and the unattended delivery time information indicating the scheduled unattended delivery time to the UGV 1. According to the control information including the unattended delivery place information and the unattended delivery time information, the unattended delivery control unit 237 causes the UGV 1 to stand by at the transport destination until the scheduled unattended delivery time (for example, as illustrated in FIG. 8, the end point EP1 of the scheduled unattended delivery time) arrives, and causes the UGV 1 to carry out the load to the unattended delivery place when the scheduled unattended delivery time arrives.

Incidentally, the unattended delivery control unit 237 may acquire, from the environmental information acquisition unit 232, environmental information obtained by sensing the environment around the UGV 1 when the scheduled unattended delivery time determined by the unattended delivery time determining unit 237 arrives, and determine whether to permit the carrying out of the load on the basis of the acquired environmental information. As a result, it is possible to carry out the load to the unattended delivery place after confirming that the unattended delivery place that has already been determined satisfies the unattended delivery condition. For example, on the basis of the environmental information obtained by sensing the environment around the UGV 1 when the scheduled unattended delivery time arrives, the unattended delivery control unit 237 confirms whether the already determined unattended delivery place is a place satisfying the unattended delivery condition at the time of sensing (for example, a region (shaded region) having brightness equal to or less than the first threshold value).

Then, if the already determined unattended delivery place satisfies the unattended delivery condition at the time of sensing, the unattended delivery control unit 237 determines to permit the carrying out of the load, and causes the communication unit 21 to transmit control information including the unattended delivery place information and the unattended delivery time information indicating the scheduled unattended delivery time to the UGV 1. That is, when determining to permit the carrying out of the load, the unattended delivery control unit 237 causes the UGV 1 to carry out the load to the unattended delivery place.

The unattended delivery place notification unit 238 notifies the recipient of the load of the unattended delivery place determined by the unattended delivery place determining unit 234. As a result, it is possible to quickly notify the recipient of the unattended delivery place of the load. For example, the unattended delivery place notification unit 238 transmits an electronic mail indicating a message including the unattended delivery place to the mail address of the recipient associated with the acquired load information. As a result, the electronic mail is acquired from a mail server by a terminal of the recipient, and the message including the unattended delivery place is displayed on the terminal or is output by voice from the terminal. As an example of the message, a message "Your load has been placed in front of the entrance of room 100 of building A (building name). Please receive the load" is displayed. The message including the unattended delivery place may be directly pushed and delivered from the management server 2 to the terminal of the recipient without passing through the mail server.

Incidentally, the unattended delivery place notification unit 238 may notify the recipient of a receiving time limit for the load together with the unattended delivery place of the load. Here, the receiving time limit for the load is a time limit in which the load is continuously placed at the unattended delivery place. The receiving time limit may be represented by a duration (for example, x hours) from when the load is placed, or may be represented by a time (for example, y (hour): z (minute)). That is, the load is limited to being placed beyond the duration or the time.

[2. Operation of Transport System S]

Next, an operation of the transport system S according to the present embodiment will be described separately in Examples 1 to 3. In this operation example, it is assumed that the UGV 1 is selected at a dispatch base where the load is carried in the UGV 1, and thereafter, the transport destination information of the load is set in the UGV 1. The transport destination information may be transferred from the management server 2 to the UGV 1. The transport destination information includes the location information of the transport destination and the load ID of the load to be transported. Incidentally, the transport destination information may include the electronic mail address of the recipient of the load.

Example 1

Figure 9:
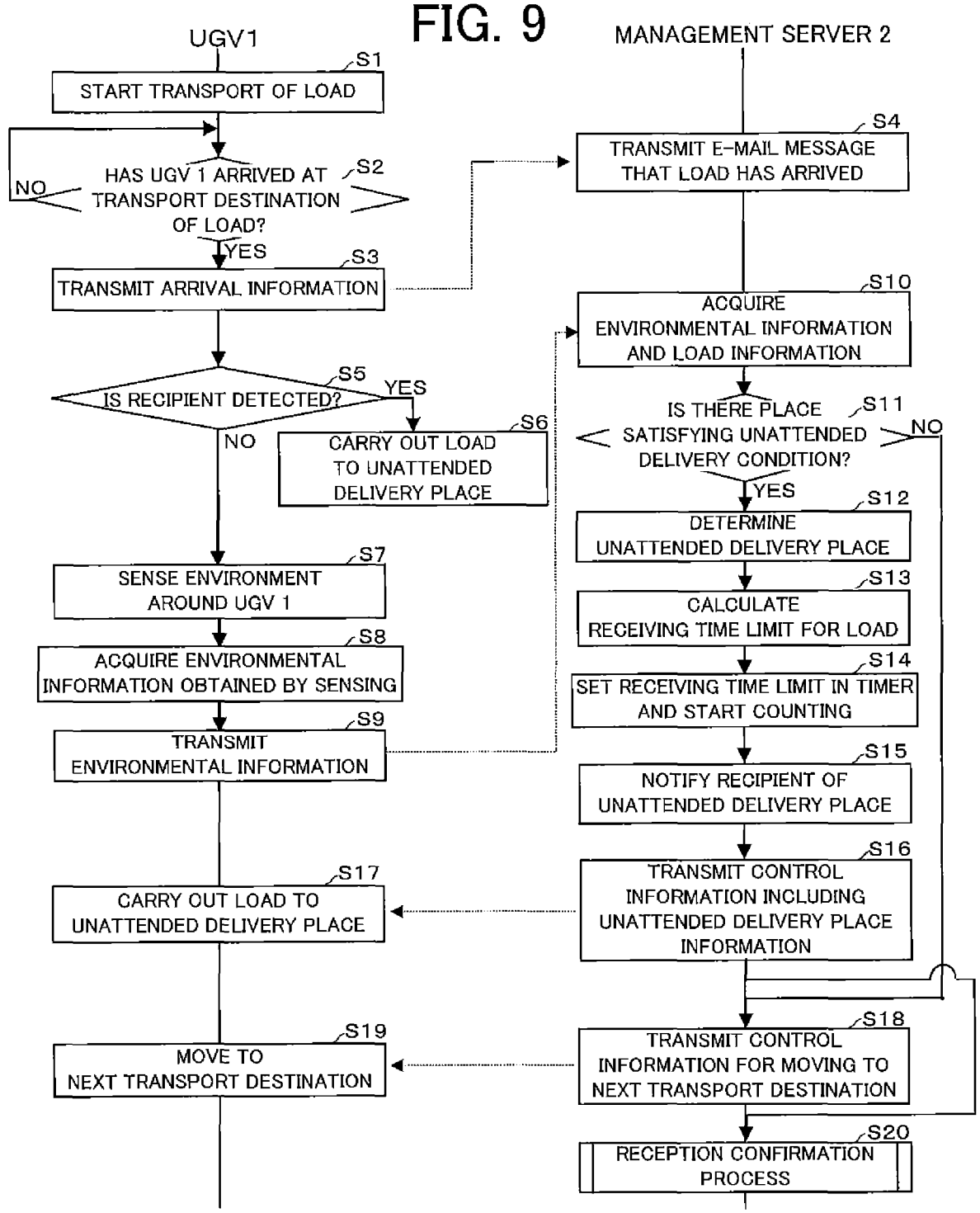
FIG. 9 is a sequence diagram illustrating an example of an operation when a load is transported to a transport destination by the UGV 1 in Example 1.

First, the operation of the transport system S according to Example 1 will be described with reference to FIG. 9. Example 1 is an example of a case where the environmental change prediction unit 235 is set to OFF. FIG. 9 is a sequence diagram illustrating an example of an operation when a load is transported to a transport destination by the UGV 1 in Example 1.

In FIG. 9, the UGV 1 starts transport from the dispatch base to the transport destination of the load in accordance with the transport destination information of the load (step S1), and then determines whether the UGV 1 has arrived at the transport destination of the load on the basis of the position information of the UGV 1 and the location information of the transport destination (step S2). This determination is repeatedly performed at regular intervals or irregular intervals. Incidentally, it may be determined whether or not the UGV 1 has approached the transport destination of the load (for example, whether or not the distance to the transport destination has reached several meters). Then, in a case where it is determined that the UGV 1 has arrived at (or approached) the transport destination of the load (step S2: YES), the UGV 1 transmits the mobile body ID of the UGV 1 to the management server 2 via the communication network NW together with arrival information to the transport destination of the load (step S3).

Next, upon acquiring the arrival information and the mobile body ID from the UGV 1, the management server 2 transmits an electronic mail indicating a message that the load has arrived to the electronic mail address of the recipient associated with the mobile body ID (step S4). Incidentally, the electronic mail may be transmitted from the UGV 1 to the recipient's electronic mail address. Alternatively, in a case where a call chime capable of receiving a short-range wireless signal is installed at the transport destination, the UGV 1 may transmit the short-range wireless signal instead of transmitting the electronic mail indicating the message that the load has arrived.

Then, when the recipient of the load appears from the doorway (for example, an entrance of a house or an office) of the transport destination in response to the receipt of the electronic mail by the terminal of the recipient of the load or the ringing of the ringing chime, the UGV 1 detects the recipient (step S5: YES), carries out the load to the unattended delivery place (step S6), and returns to the return location or moves to the next transport destination.

On the other hand, when it is difficult to detect the recipient within, for example, several minutes from the transmitting of the arrival information (step S5: NO), the UGV 1 determines that it is difficult for the recipient to directly receive the load, activates the sensor unit 15 to sense the environment around the UGV 1 (step S7), and acquires environmental information obtained by the sensing (step S8). That is, sensing of the environment of the transport destination is performed when it is determined that it is difficult for the recipient to directly receive the load at the transport destination. Incidentally, the environmental information obtained by sensing the environment of a plurality of regions around the UGV 1 may be acquired.

Next, the UGV 1 transmits the mobile body ID of the UGV 1 to the management server 2 via the communication network NW together with the environmental information acquired in step S8 (step S9). Next, upon acquiring the environmental information and the mobile body ID from the UGV 1, the management server 2 acquires the load information associated with the mobile body ID and the mail address of the recipient from the load database 221 (step S10).

Next, the management server 2 determines whether or not there is a place satisfying the unattended delivery condition on the basis of the environmental information and the load information acquired in step S10 (step S11). For example, as described above, in the case where the information indicating "not arrangeable in the sun" is associated with the type included in the load information, the management server 2 determines that there is a place satisfying the unattended delivery condition when a region (shaded region) where the brightness is equal to or less than the first threshold value can be detected based on the brightness distribution around the UGV 1 at the transport destination of the load. When the management server 2 determines that there is a place satisfying the unattended delivery condition (step S11: YES), the process proceeds to step S12. On the other hand, when the management server 2 determines that there is no place satisfying the unattended delivery condition (step S11: NO), the process proceeds to step S18.

In step S12, the management server 2 determines a place (for example, a partial region in the detected shaded region) satisfying the unattended delivery condition as the unattended delivery place. Incidentally, when the environmental information obtained by sensing the environment of a plurality of regions around the UGV 1 is acquired, the management server 2 determines the unattended delivery place of the load in any region of the plurality of regions. As a result, it is possible to determine the unattended delivery place of the load from a more appropriate region among the plurality of regions around the UGV 1. In this case, when it is determined that there is a place satisfying the unattended delivery condition in each of the plurality of regions, the unattended delivery place may be determined from, for example, the darkest region or the region having the lowest temperature among these regions.

Next, the management server 2 calculates a receiving time limit for the load on the basis of the environmental information and the load information acquired in step S10 (step S13). The receiving time limit for the load is calculated using, for example, data (for example, a table) or a function that defines a relationship between a combination of the type of the load and the environmental information and the receiving time limit. For example, a time associated with a combination of fresh food as the load transported by the UGV 1 and a temperature of 20° C. at the transport destination of the load is calculated.

Alternatively, the receiving time limit may be calculated using an estimation model in which a value obtained by quantifying the type indicated in the load information and the environmental information is input and the receiving time limit is output. In this case, machine learning of the estimation model may be performed using correct answer data regarding the receiving time limit and a data set of the type of the load and the environmental information as teacher data. By inputting a value obtained by quantifying the type of the load and the environmental information to such a learned estimation model, a more appropriate receiving time limit can be obtained from the learned estimation model.

Next, the management server 2 sets the receiving time limit calculated in step S13 in a timer and starts counting (step S14). Next, the management server 2 notifies the recipient of the unattended delivery place determined in step S12 (step S15). For example, a message including the unattended delivery place is set in an electronic mail, and an e-mail indicating the message including the unattended delivery place is transmitted to the mail address of the recipient of the load. Incidentally, the management server 2 may notify the recipient of the receiving time limit calculated in step S13 together with the unattended delivery place determined in step S12.

Next, the management server 2 transmits control information including the unattended delivery place information indicating the unattended delivery place determined in step S12 to the UGV 1 via the communication network NW (step S16), and proceeds to step S20. This control information indicates a control command for carrying out the load. In response to such a control command, the UGV 1 carries out the load to the unattended delivery place (step S17), and returns to the return location or moves to the next transport destination.

In step S18, the management server 2 transmits control information indicating a control command for returning to the return location or moving to the next transport destination to the UGV 1 via the communication network NW. In response to such a control command, the UGV 1 returns to the return location or moves to the next transport destination (step S19).

Incidentally, for example, in a case where a scheduled receiving time of a load can be acquired from the load database 221, even when determination in step S11 that there is no place satisfying the unattended delivery condition, the management server 2 may determine the place (place not satisfying the unattended delivery condition) as the unattended delivery place of the load on the basis of the scheduled receiving time of the load. For example, when the time from the present time to the scheduled receiving time is short (for example, about 5 minutes), a place not satisfying the unattended delivery condition may be determined as the unattended delivery place of the load. As a result, it is possible to take a flexible response according to the schedule of the recipient of the load.

Figure 10:
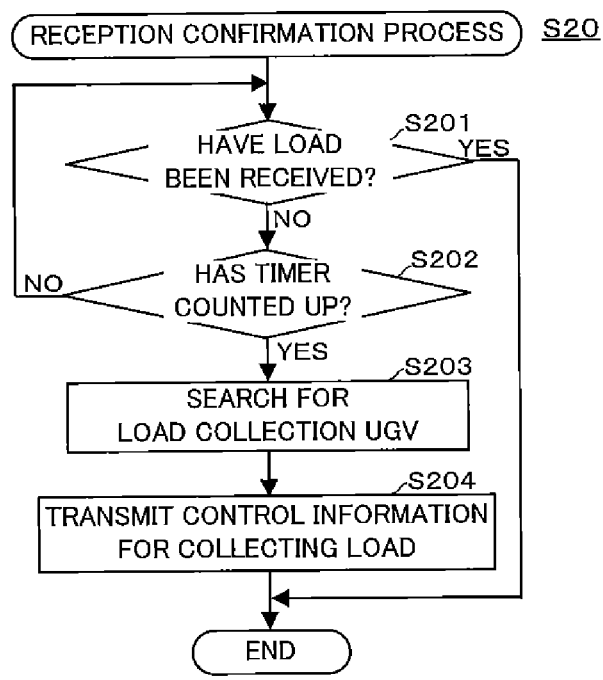
FIG. 10 is a flowchart illustrating details of a reception confirmation process in step S20 illustrated in FIG. 9.

FIG. 10 is a flowchart illustrating details of a reception confirmation process in step S20 illustrated in FIG. 9. As illustrated in FIG. 10, the management server 2 determines whether the load placed at the unattended delivery place has been received (step S201). For example, when a receipt message transmitted from the terminal of the recipient who has received the load is received by the management server 2, it is determined that the load has been received. In this case, for example, a button indicating the receipt confirmation of the load is displayed on the display screen of the terminal of the recipient, and when the button is selected by the recipient, a receipt message indicating the receipt of the load is transmitted to the management server 2. However, the management server 2 may confirm the receipt of the load by other methods. For example, in a case where a monitoring device including a camera is installed at a transport destination, when the monitoring device detects that a load is received based on a video captured by the camera, the monitoring device may transmit a receipt message indicating receipt of the load to the management server 2.

Then, when the management server 2 determines that the load placed at the unattended delivery place has been received (step S201: YES), the reception confirmation process ends. On the other hand, when determining that the load placed at the unattended delivery place has not been received (step S201: NO), the management server 2 determines whether or not the timer in which the receiving time limit has been set has counted up (that is, whether the receiving time limit has elapsed) (step S202). When the management server 2 determines that the timer does not count up (step S202: NO), the process returns to step S201. On the other hand, when the management server 2 determines that the timer has counted up (step S202: YES), the process proceeds to step S203.

In step S203, the management server 2 refers to the position information and the carrying possibility information of the UGV 1 in the load database 221, and searches for the UGV 1 that can carry the load and is located closest to the transport destination as a load collection UGV. The UGV 1 found by such a search may be the UGV 1 that has placed the load at the unattended delivery place, or may be the UGV 1 different from the UGV 1 that has placed the load at the unattended delivery place. Then, the management server 2 transmits control information indicating a control command for collecting the load to the load collection UGV found by the search (step S204), and the receipt confirmation process ends. That is, in a case where the management server 2 fails to confirm the receipt of the load even after the receiving time limit has elapsed after the load is placed at the transport destination, the management server 2 performs control for collecting the load. In response to such a control command, the load collection UGV moves to the transport destination to collect the load, and returns to the return location or moves to the next transport destination. As a result, even in a case where the load is not received until the receiving time limit elapses due to the reason on the recipient side, it is possible to reliably prevent the load from being left for a long period of time even after the receiving time limit has elapsed.

Example 2

Next, the operation of the transport system S according to Example 2 will be described with reference to FIG. 11. Example 2 is an example of a case where the environmental change prediction unit 235 is set to ON. FIG. 11 is a sequence diagram illustrating an example of an operation when a load is transported to a transport destination by the UGV 1 in Example 2. Incidentally, steps S31 to S39 illustrated in FIG. 11 are similar to steps S1 to S9 illustrated in FIG. 9. Moreover, steps S47 to S52 illustrated in FIG. 11 are similar to steps S15 to S20 illustrated in FIG. 9.

Upon acquiring the environmental information and the mobile body ID from the UGV 1, the management server 2 acquires the load information associated with the mobile body ID and the mail address of the recipient from the load database 221 (step S40). Next, the management server 2 acquires environmental information indicating an environment according to the position information of the transport destination of the load (step S41). Incidentally, the management server 2 may acquire structure information of a building at the transport destination of the load.

Next, the management server 2 predicts a time-series environmental change around the UGV 1 on the basis of the environmental information and the load information acquired in steps S40 and S41 (step S42). For example, as described above, in the case where the information indicating that "not arrangeable in the sun" is associated with the type included in the load information, the time-series brightness change around the UGV 1 is predicted based on the brightness distribution around the UGV 1 at the transport destination of the load and the weather (or sunshine hours) of the day. Incidentally, the management server 2 may predict the time-series environmental change around the UGV 1 on the basis of the environmental information, the load information, and the structure information acquired in steps S40 and S41.

Next, the management server 2 determines whether or not there is a place satisfying the unattended delivery condition continuously for a predetermined time T or longer on the basis of the time-series environmental change predicted in step S42 (step S43). For example, when the region (shaded region) where the brightness is continuously equal to or less than the first threshold value for the predetermined time T or longer can be detected, the management server 2 determines that there is a place satisfying the unattended delivery condition. Then, when the management server 2 determines that there is a place satisfying the unattended delivery condition continuously for the predetermined time T or longer (step S43: YES), the process proceeds to step S44. On the other hand, when the management server 2 determines that there is no place satisfying the unattended delivery condition continuously for the predetermined time T or longer (step S43: NO), the process proceeds to step S50.

In step S44, the management server 2 determines the place satisfying the unattended delivery condition continuously for the predetermined time T or longer as the unattended delivery place. Next, the management server 2 calculates a duration (for example, a shade duration) satisfying the unattended delivery condition (step S45). Next, the management server 2 sets the duration (for example, 60 minutes) calculated in step S45 in the timer as the receiving time limit and starts counting (step S46). Here, the receiving time limit obtained by subtracting a minutes (for example, 5 minutes) from the duration may be set in the timer.

Example 3

Next, the operation of the transport system S according to Example 3 will be described with reference to FIG. 12. Example 3 is an example of a case where the environmental change prediction unit 235 is set to ON and the UGV 1 stands by for the scheduled unattended delivery time to place the load. FIG. 12 is a sequence diagram illustrating an example of an operation when a load is transported to a transport destination by the UGV 1 in Example 3. Incidentally, steps S61 to S77 illustrated in FIG. 12 are similar to steps S31 to S47 illustrated in FIG. 11. Moreover, steps S85 to S87 illustrated in FIG. 12 are similar to steps S50 to S52 illustrated in FIG. 11.

In step S78, the management server 2 determines whether or not the unattended delivery place determined in step S74 satisfies the unattended delivery condition from the time of sensing to a start point of the duration calculated in step S75. When determining that the unattended delivery condition is satisfied (for example, there is a shaded region at the time of sensing) from the time of sensing to the start point of the duration (step S78: YES), the management server 2 transmits control information including the unattended delivery place information indicating the unattended delivery place determined in step S74 to the UGV 1 via the communication network NW (step S79), and the process proceeds to step S87. Such control information indicates a control command for carrying out the load. In response to such a control command, the UGV 1 carries out the load to the unattended delivery place (step S80), and returns to the return location or moves to the next transport destination.

On the other hand, when determining that the unattended delivery condition is not satisfied (for example, there is no shaded region yet at the time of sensing) from the time of sensing to the start point of the duration (step S78: NO), the management server 2 determines the scheduled unattended delivery time (standby time) for placing the load at the unattended delivery place determined in step S74 (step S81).

Next, the management server 2 transmits control information including the unattended delivery place information indicating the unattended delivery place determined in step S74 and the unattended delivery time information indicating the scheduled unattended delivery time calculated in step S81 to the UGV 1 via the communication network NW (step S82), and the process proceeds to step S87. This control information indicates a control command for causing the UGV 1 to stand by and then carrying out the load. In response to such a control command, the UGV 1 stands by in a state of carrying the load at the transport destination of the load (step S83). Then, when arrival of the scheduled unattended delivery time is detected, the UGV 1 carries out the load to the unattended delivery place (step S84), and returns to the return location or moves to the next transport destination.

Incidentally, the control information transmitted in step S82 may indicate a control command for causing the UGV 1 to stand by and then perform sensing. In this case, when the arrival of the scheduled unattended delivery time is detected, the UGV 1 senses the environment around the UGV 1 without carrying out the load to the unattended delivery place, acquires environmental information obtained by the sensing, and transmits the environmental information to the management server 2. Then, when acquiring the environmental information from the UGV 1, the management server 2 determines whether to permit carrying out of the load on the basis of the environmental information. For example, when the unattended delivery place determined in step S74 is a place satisfying the unattended delivery condition at the time of sensing, the management server 2 determines to permit the carrying out of the load, and transmits control information indicating a control command for carrying out the load to the UGV 1. In response to such a control command, the UGV 1 carries out the load to the unattended delivery place.

As described above, according to the above embodiment, it is configured such that the load information of the load transported by the UGV 1 is acquired, the environmental information obtained by sensing the environment around the UGV 2 by the sensor mounted on the UGV 1 at the transport destination of the load is acquired, and the unattended delivery place where the load is placed by the UGV 1 at the transport destination of the load is determined based on the acquired load information and environmental information. Therefore, the load can be placed at an appropriate unattended delivery place for each load in accordance with the environment of the transport destination.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. For example, the UGV 1 may include a place determining unit (the same function as the unattended delivery place determining unit 234 of the management server 2) that determines the unattended delivery place of the load at the transport destination on the basis of the load information and environmental information described above. Furthermore, the UGV 1 may include a prediction unit (the same function as the environmental change prediction unit 235 of the management server 2) that acquires environmental information indicating an environment according to the position information of the transport destination of the load from the management server 3 and predicts a time-series environmental change around the UGV 1 on the basis of the acquired environmental information and the environmental information obtained by sensing the environment around the UGV 1. In this case, the UGV 1 determines the unattended delivery place of the load at the transport destination on the basis of the predicted time-series environmental change. Moreover, the UGV 1 may include a time determining unit (the same function as the unattended delivery time determining unit 236 of the management server 2) that determines a scheduled time for placing the load at the determined unattended delivery place on the basis of the predicted time-series environmental change. In this case, the UGV 1 carries out the load to the unattended delivery place when the determined scheduled time arrives. Furthermore, the UGV 1 may include a determination unit (the same function as the unattended delivery control unit 237 of the management server 2) that determines whether to permit the carrying out of the load on the basis of the environmental information obtained by sensing the environment around the UGV 1 when the determined scheduled time arrives. In this case, when determining to permit the carrying out of the load, the UGV 1 carries out the load to the unattended delivery place.

REFERENCE SIGNS LIST

1 UGV
2 Management server
11 Drive unit
12 Positioning unit
13 Communication unit
14 Imaging unit
15 Sensor unit
16 Storage unit
17 Control unit
101 wheels
102 Load storage section
103, 104 Load carry-out mechanism
21 Communication unit
22 Storage unit
23 Control unit
231 load information acquisition unit
232 Environmental information acquisition unit
233 Structure information acquisition unit
234 Unattended delivery place determining unit
235 Environmental change prediction unit
236 Unattended delivery time determining unit
237 Unattended delivery control unit
238 Unattended delivery place notification unit
NW Communication network
S Transport system

The invention claimed is:

1. An information processing device, comprising:
at least one memory configured to store program code; and
at least one processor configured to access the program code and operate as instructed by the program code, the program code including:
load information acquisition code configured to cause the at least one processor to acquire load information of a load to be transported by an unmanned mobile body being movable unmanned, wherein the load information includes a type of the load;
environmental information acquisition code configured to cause the at least one processor to acquire environmental information obtained by sensing an environment around the unmanned mobile body by a sensor mounted on the unmanned mobile body at a transport destination of the load;
prediction code configured to cause the at least one processor to predict a time-series change in a shaded region as a time-series environmental change around the unmanned mobile body on the basis of the environmental information, wherein the prediction is based on a brightness distribution, daily sun altitude, daily sun azimuth, and a structure information of a building; and
place determining code configured to cause the at least one processor to determine a place where the load is to be placed by the unmanned mobile body at the transport destination on the basis of the type of the load and the predicted time-series change.

2. The information processing device according to claim 1, wherein the environmental information acquisition code causes the at least one processor to acquire environmental information indicating an environment according to position information of the transport destination of the load, in addition to the environmental information obtained by sensing the environment around the unmanned mobile body.

3. The information processing device according to claim 1, wherein the environmental information acquisition code causes the at least one processor to acquire environmental information obtained by sensing environments of a plurality of regions around the unmanned mobile body by the sensor, and
the place determining code causes the at least one processor to determine the place where the load is to be placed in any region of the plurality of regions.

4. The information processing device according to claim 1, wherein the place determining code causes the at least one processor to determine a shaded place at the transport destination as the place where the load is placed.

5. The information processing device according to claim 1, wherein the place determining code causes the at least one processor to determine the place where the load is to be placed further on the basis of a scheduled receiving time of the load.

6. The information processing device according to claim 1, the program code further including:
time determining code configured to cause the at least one processor to determine a scheduled time for placing the load at the determined place on the basis of the predicted time- series environmental change; and
control code configured to cause the at least one processor to cause the unmanned mobile body to carry out the load at the determined scheduled time.

7. The information processing device according to claim 6, the program code further including determination code configured to cause the at least one processor to determine whether to permit carrying out of the load on the basis of the environmental information obtained by sensing the environment around the unmanned mobile body when the determined scheduled time arrives,
wherein the control code causes the at least one processor to cause the unmanned mobile body to carry out the load in response to determining to permit carrying out of the load.

8. The information processing device according to claim 1, the program code further including notification code configured to cause the at least one processor to notify a recipient of the load of the determined place.

9. The transport system according to claim 8, further comprising the control code configured to cause the at least one processor to perform control for collecting the load in a case where it is failed to confirm receipt of the load even after the place is notified to the recipient.

10. The information processing device according to claim 1, wherein in a case where it is determined that the recipient is not able to receive the load directly at the transport destination, the place determining code causes the at least one processor to determine the place where the load is placed.

11. The transport system according to claim 1, wherein the sensing is performed in a case where it is determined that the recipient is not able to receive the load directly at the transport destination.

12. The information processing device according to claim 1, wherein the structure information includes a height of the building and a three-dimensional position information of a wall, a floor, and a space under eaves near an entrance of the building.

13. An unmanned mobile body being movable unmanned and configured to transport a load to a transport destination, the unmanned mobile body comprising:
- a sensor configured to sense an environment around the unmanned mobile body at the transport destination of the load; and
- a control circuitry configured to;

predict a time-series change in a shaded region as a time-series environmental change around the unmanned mobile body on the basis of environmental information obtained by the sensor, wherein the prediction is based on a brightness distribution, daily sun altitude, daily sun azimuth, and a structure information of a building; and
carry out the load to a place determined on the basis of a type of the load and the predicted time-series change.

* * * * *